United States Patent
Chuang et al.

(10) Patent No.: US 11,841,740 B2
(45) Date of Patent: Dec. 12, 2023

(54) DP-OUT ADAPTER AND ASSOCIATED CONTROL METHOD

(71) Applicant: Realtek Semiconductor Corp., HsinChu (TW)

(72) Inventors: Bing-Juo Chuang, HsinChu (TW); Jing-Chu Chan, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/719,406

(22) Filed: Apr. 13, 2022

(65) Prior Publication Data

US 2023/0021109 A1    Jan. 19, 2023

(30) Foreign Application Priority Data

Jul. 14, 2021    (TW) .................................. 110125892

(51) Int. Cl.
*G06F 1/10*       (2006.01)
*G06F 13/42*      (2006.01)

(52) U.S. Cl.
CPC ............ *G06F 1/10* (2013.01); *G06F 13/4282* (2013.01); *G06F 2213/0042* (2013.01)

(58) Field of Classification Search
CPC .................. G06F 1/10; G06F 13/4282; G06F 2213/0042; G06F 1/08; G06F 13/385; G06F 13/4295; G06F 1/04; G06F 1/12; H04N 21/4305; H04N 21/242; H04N 21/4341; H03L 7/0807; H03L 7/085; H03L 7/07; H04L 7/0037; H04L 7/0331; H04L 7/0008

USPC ..... 375/371, 215, 376, 240.28, E7.278, 354, 375/355, 373, 357; 713/502, 500, 400, 713/503, 501; 370/503, 350, 509, 512, 370/516

See application file for complete search history.

(56) References Cited

U.S. PATENT DOCUMENTS

| | | | |
|---|---|---|---|
| 9,402,092 B2* | 7/2016 | Morotomi | H04N 21/8547 |
| 2011/0093736 A1* | 4/2011 | Chiang | H04L 7/0331 |
| | | | 713/502 |
| 2015/0063513 A1* | 3/2015 | Gu | H03J 7/04 |
| | | | 375/355 |
| 2015/0078405 A1* | 3/2015 | Roberts | H04J 3/0658 |
| | | | 370/509 |

(Continued)

FOREIGN PATENT DOCUMENTS

EP    0 936 816 A2    8/1999

*Primary Examiner* — Faisal M Zaman
(74) *Attorney, Agent, or Firm* — Winston Hsu

(57) ABSTRACT

The present invention provides a DP-out adapter including a decoder, a clock signal generating circuit, a DP signal generating circuit and a symbol counter value comparator. The decoder is configured to decode a USB signal to generate a plurality of packets. The clock signal generating circuit is configured to generate a clock signal. The DP signal generating circuit is configured to generate a DP signal according to the packets, and output the DP signal according to the clock signal. The symbol counter value comparator is configured to generate a first counter value according to a number of symbols corresponding to the plurality of packets, and use the clock signal to count to obtain a second counter value, and compare the first counter value and the second counter value to generate a control signal to the clock signal generating circuit to adjust a frequency of the clock signal.

10 Claims, 5 Drawing Sheets

(56) References Cited

U.S. PATENT DOCUMENTS

2017/0019249 A1* 1/2017 Kobayashi .......... H04L 63/0428
2017/0310460 A1* 10/2017 Yang ..................... H04L 7/0037
2021/0055777 A1* 2/2021 Regupathy ............. G06F 1/266
2022/0276981 A1* 9/2022 Nelson ................ G06F 13/4295

* cited by examiner

DP-OUT ADAPTER AND ASSOCIATED CONTROL METHOD

BACKGROUND OF THE INVENTION

1. Field of the Invention

The present invention relates to a display port (DP)-out adapter applied to a universal serial bus (USB) device.

2. Description of the Prior Art

In the specification of USB version 4 (hereinafter referred to as USB4), it provides tunnels to transmit data of other protocols. For example, USB4 can support the tunneling protocol based on DP signal tunneling (DP tunneling). For example, when one or more electronic devices use signals complied with the USB4 standard to transmit the DP signal, assuming that the current DP signal operates at a frequency of 2.7 GHz, a link symbol rate of a DP-in adapter will also be 2.7 GHz, and the DP-in adapter will transmit each symbol through the related circuits and interfaces of USB4 under a certain degree of compression. Then, after receiving a transport layer signal of USB4, a DP-out adapter decompresses the transport layer signal to generate image data, and uses a local clock signal to transmit the image data to a display, wherein the frequency of the local clock signal must be the same as the link symbol rate of the DP-in adapter, such as 2.7 GHz. In short, the frequency of the DP signal received by the DP-in adapter must be the same as the frequency of the DP signal outputted by the DP-out adapter to ensure the integrity of the data. However, since the frequencies of the local clock signals used by the DP-in adapter and the DP-out adapter may be different, data loss may occur in the long run.

In order to solve the above problem, the DP-in adapter will send a clock synchronization packet to the DP-out adapter at a specific time to perform frequency correction of the local clock signal. However, since a transmission time of the clock synchronization packet is usually about 2 milliseconds, the DP-out adapter will adjust the frequency of the local clock signal once in about 2 milliseconds, wherein about 1.7 million packets are transmitted in the 2 millisecond period. Therefore, the above adjustment method may cause the severe adjustment of the clock signal if there is a large frequency difference between the local clock signals of the DP-in adapter and the DP-out adapter, and the DP-out adapter needs to set a larger buffer space in order to avoid the symbols that may be missed due to the deviation of the local clock signals in the period of 2 milliseconds.

SUMMARY OF THE INVENTION

It is therefore an objective of the present invention to provide a DP-out adapter, which can shorten the frequency adjustment interval of the clock signal without affecting the transmission of other signals, so as to solve the problems in the prior art.

According to one embodiment of the present invention, a DP-out adapter is disclosed. The DP-out adapter comprises a decoder, a clock signal generating circuit, a DP signal generating circuit and a symbol counter value comparator. The decoder is configured to decode a USB signal to generate a plurality of packets. The clock signal generating circuit is configured to generate a clock signal. The DP signal generating circuit is configured to generate a DP signal according to the plurality of packets, and output the DP signal according to the clock signal. The symbol counter value comparator is configured to generate a first counter value according to a number of symbols corresponding to the plurality of packets, and use the clock signal to count to obtain a second counter value, and compare the first counter value and the second counter value to generate a control signal to the clock signal generating circuit to adjust a frequency of the clock signal.

According to one embodiment of the present invention, a control method of a DP-out adapter comprises the steps of: decoding a USB signal to generate a plurality of packets; using a clock signal generating circuit to generate a clock signal; using a DP signal generating circuit to generate a DP signal according to the plurality of packets, and output the DP signal according to the clock signal; generating a first counter value according to a number of symbols corresponding to the plurality of packets in real time; using the clock signal to count to obtain a second counter value; and comparing the first counter value and the second counter value to generate a control signal to the clock signal generating circuit to adjust a frequency of the clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
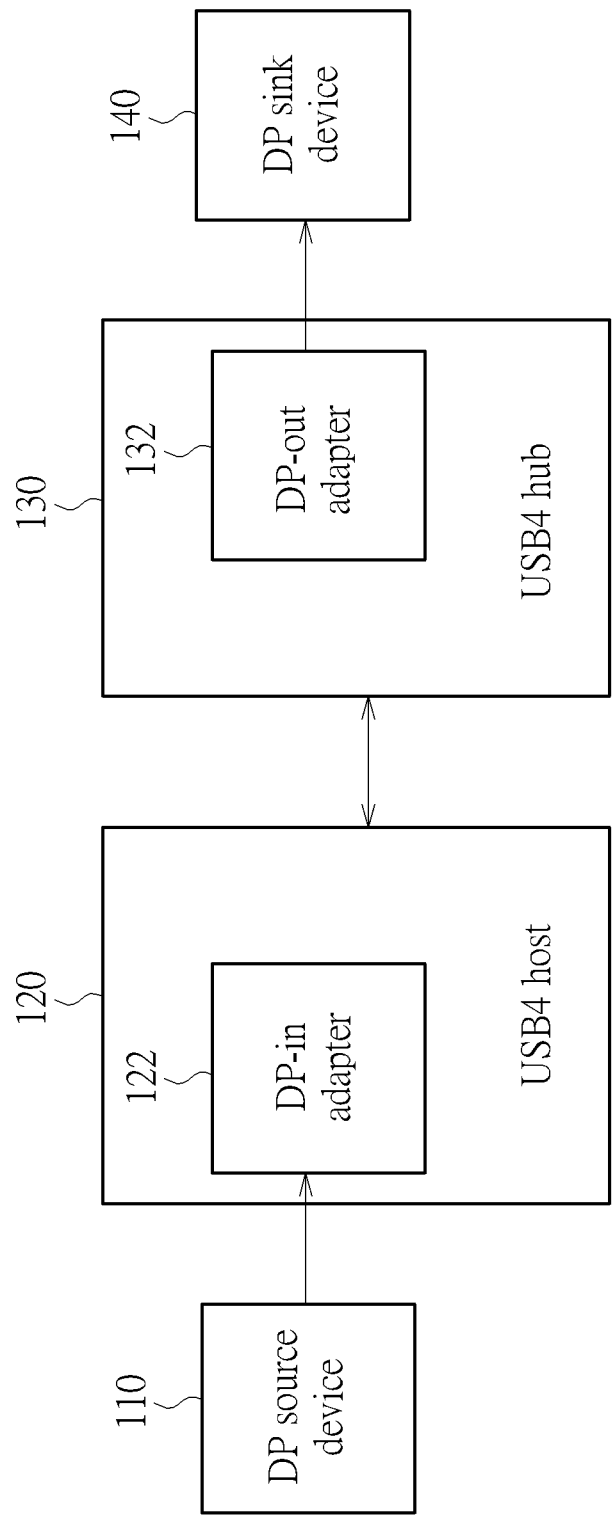
FIG. 1 is a USB4 system according to one embodiment of the present invention.

FIG. 1 is a USB4 system according to one embodiment of the present invention. As shown in FIG. 1, the USB4 system comprises a DP source device 110, a USB4 host 120, a USB4 hub 130 and a DP sink device 140, wherein the USB4 host 120 comprises a DP-in adapter 122, and the USB4 hub 130 comprises a DP-out adapter 132. In this embodiment, the DP source device 110 can be any component or device that can generate image data conforming to the DP standard. The DP-in adapter 122 in the USB4 host 120 is used to convert the DP signal into a USB4 signal, and transmit the USB4 signal to the USB4 hub 130 through the USB4 interface. The DP-out adapter 132 in the USB4 hub 130 converts the USB4 signal into a DP signal, and transmits this DP signal to the DP sink device 140 (e.g., a display) for playback.

As described in the prior art, since the transmission of the DP signal does not want to miss any symbol, the clock signals used by the DP-in adapter 122 and the DP-out adapter 132 will have the same frequency, such as 2.7 GHz. However, since the clock signals in different devices will inevitably have deviations, the DP-out adapter 132 needs to continuously adjust the frequency of its own clock signals to avoid the problem of losing the symbols of the DP signal due to the frequency difference between the clock signals of the DP-in adapter 122 and the DP-out adapter 132. The present embodiment proposes a design of the DP-out adapter 132, which can quickly determine the frequency difference between the clock signals of the DP-in adapter 122 and the DP-out adapter 132, so as to quickly adjust the frequency of the clock signal of the DP-out adapter 132.

Figure 2:
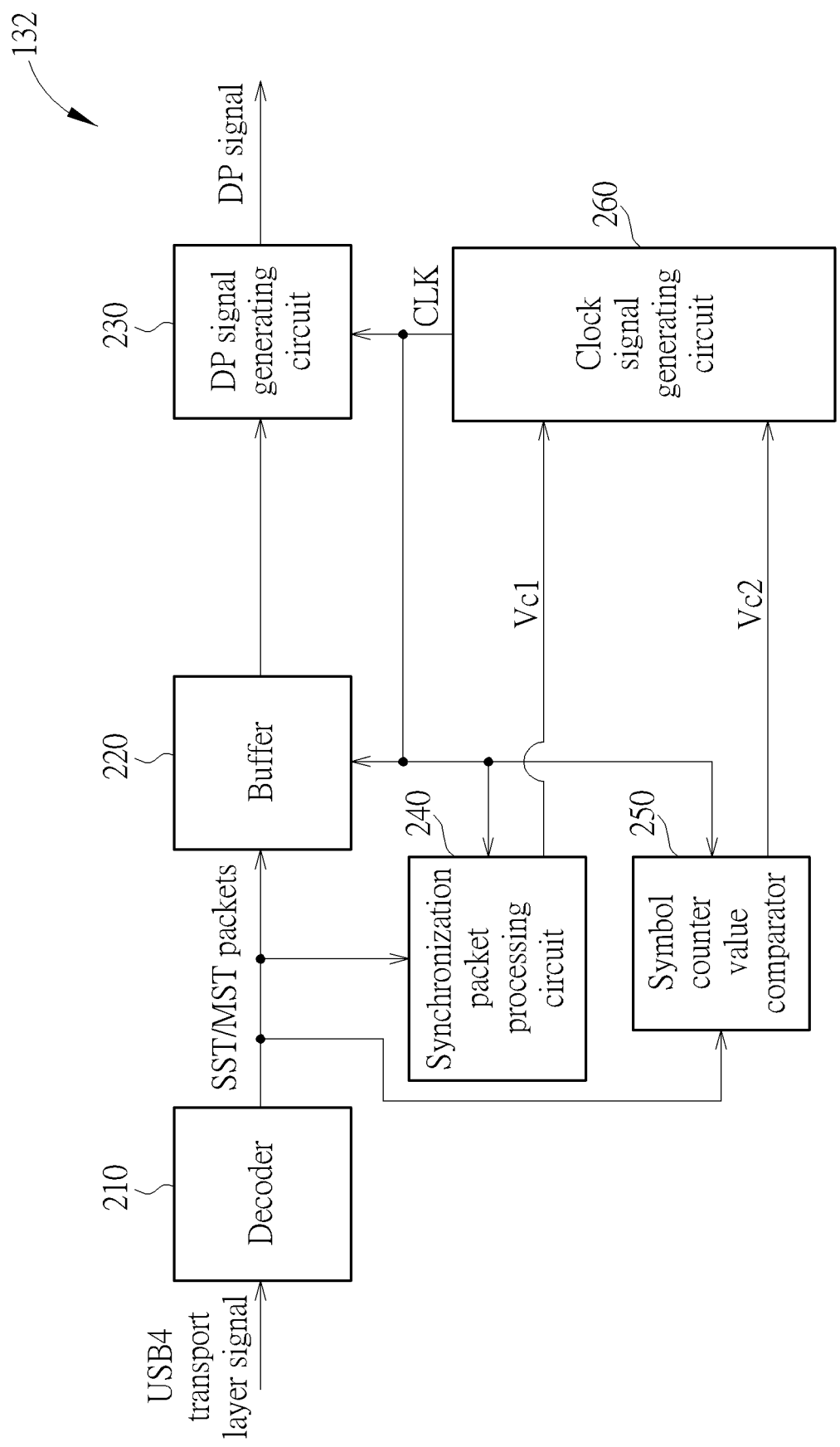
FIG. 2 is a diagram illustrating a DP-out adapter according to one embodiment of the present invention.

Specifically, referring to FIG. 2, which is a diagram illustrating the DP-out adapter 132 according to one embodiment of the present invention. As shown in FIG. 2, the DP-out adapter 132 includes a decoder 210, a buffer 220, a DP signal generating circuit 230, a synchronization packet processing circuit 240, a symbol counter value comparator 250 and a clock signal generating circuit 260. In the operation of the DP-out adapter 132, the decoder 210 may be a decoder conforming to "hopid9" in the USB4 specification, which is used to decode the USB4 transport layer signal to generate single stream transport (SST) packets or multistream transport (MST) packets, and the SST packets or the MST packets are stored in the buffer 220. At this time, the synchronization packet processing circuit 240 receives a clock synchronization packet sent from the USB4 host 120 about every two milliseconds, and generates a control signal Vc1 according to the content of the clock synchronization packet to control the clock signal generating circuit 260 to increase or decrease the frequency of the clock signal CLK. For example, the DP-in adapter 122 of the USB4 host 120 has a counter inside, wherein the counter uses the local clock signal to continuously count, and generates a counter value every $2^{21}$ nanoseconds, and perform infinite impulse response (IIR) filtering operation on the counter value, and then transmit the filtered counter value to the USB hub 130 through a clock synchronization packet. At the same time, the synchronization packet processing circuit 240 in the DP-out adapter 132 also includes a counter to continuously count using the clock signal CLK, and generate a counter value every $2^{21}$ nanoseconds. Therefore, the synchronization packet processing circuit 240 can determine whether to reduce or increase the frequency of the clock signal CLK according to the counter value generated by itself and the counter value from the clock synchronization packet. For example, if the counter value generated by the synchronization packet processing circuit 240 itself is higher than the counter value in the clock synchronization packet, the control signal Vc1 is generated to control the clock signal generating circuit 260 to reduce the frequency of the clock signal CLK. If the counter value generated by the synchronization packet processing circuit 240 is lower than the counter value in the clock synchronization packet, the control signal Vc1 is generated to control the clock signal generating circuit 260 to increase the frequency of the clock signal CLK.

Figure 3:
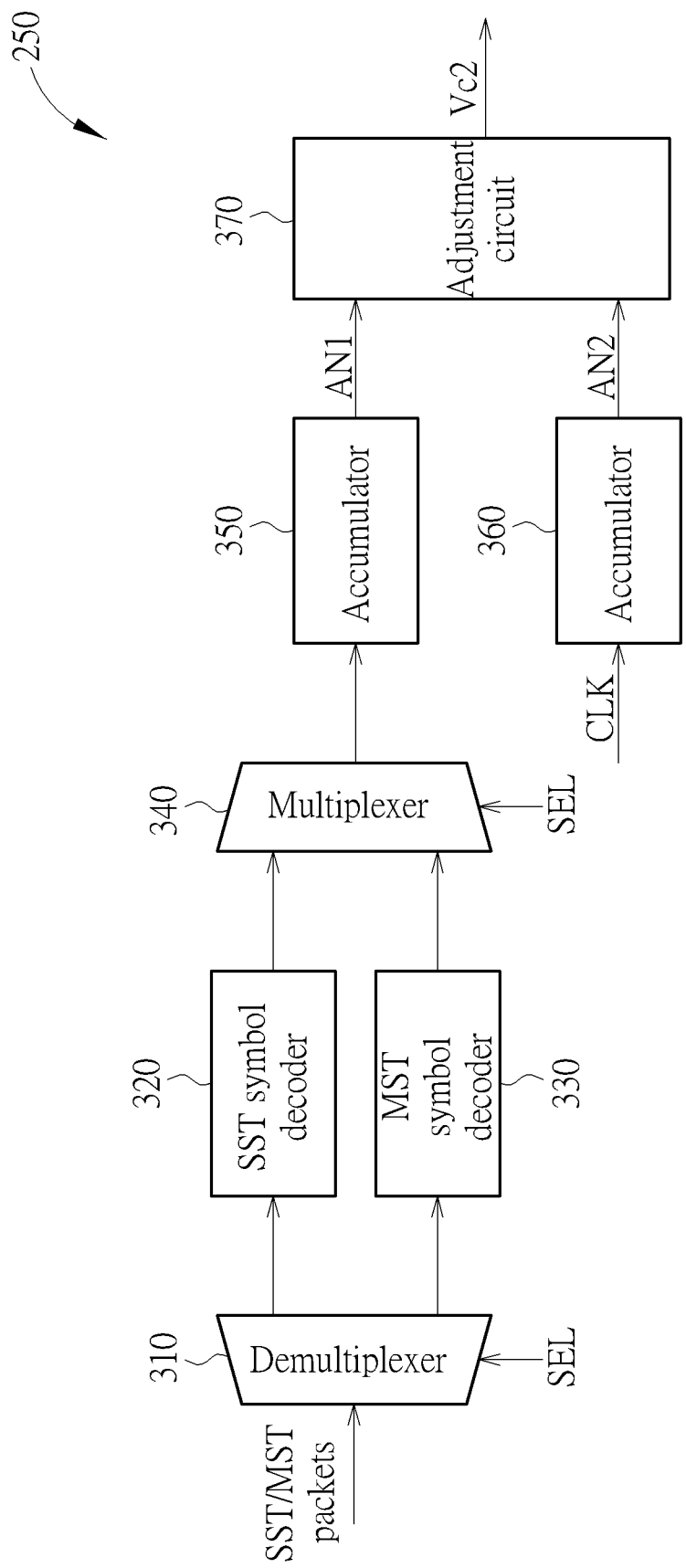
FIG. 3 is a diagram illustrating a symbol counter value comparator according to one embodiment of the present invention.

Since the synchronization packet processing circuit 240 only generates the control signal Vc1 every $2^{21}$ nanoseconds to control the clock signal generating circuit 260 to adjust the frequency of the clock signal CLK, the frequency difference between the clock signals of the DP-in adapter 122 and the DP-out adapter 132 cannot be quickly reflected. Therefore, the present embodiment proposes the symbol counter value comparator 250, which can generate a control signal Vc2 in real time when each packet is received, so as to control the clock signal generating circuit 260 to adjust the frequency of the clock signal CLK. Specifically, FIG. 3 is a diagram illustrating the symbol counter value comparator 250 according to one embodiment of the present invention. As shown in FIG. 3, the symbol counter value comparator 250 comprises a demultiplexer 310, an SST symbol decoder 320, an MST symbol decoder 330, a multiplexer 340, two accumulators 350, 360 and an adjustment circuit 370. In the operation of the symbol counter value comparator 250, first, the demultiplexer 310 determines whether to transmit the packet decoded by the decoder 210 to the SST symbol decoder 320 or the MST symbol decoder 330 according to a selection signal SEL, wherein the selection signal SEL is used to indicate whether the packet decoded by the decoder 210 is an SST packet or an MST packet. If the decoder 210 generates the SST packet, the packet is inputted into the SST symbol decoder 320, and if the decoder 210 generates the MST packet, the packet is inputted into the MST symbol decoder 330.

Figure 4:
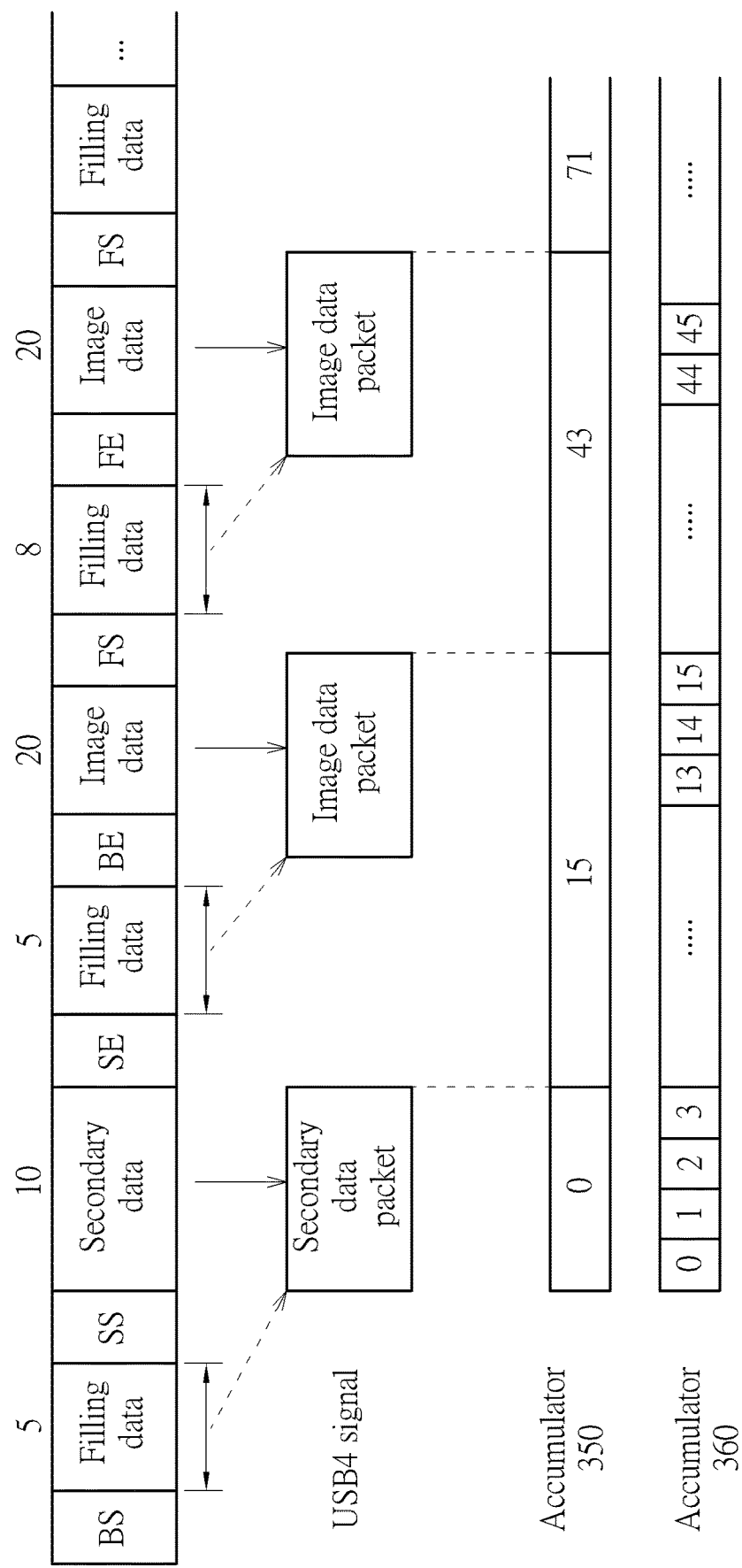
FIG. 4 shows operations of a SST symbol decoder and an accumulator according to one embodiment of the present invention.

In one embodiment, if the decoder 210 outputs the SST packet, the SST symbol decoder 320 decodes the SST packet to calculate the number of symbols of the DP signal actually corresponding to the currently received packet, and transmits the calculated number of symbols of the DP signal to the accumulator 350 via the multiplexer 340. In detail, referring to FIG. 4, the DP signal generated by the DP source device 110 sequentially includes a blanking start (BS), filling data (5 symbols), secondary data start (SS), secondary data (10 symbols), secondary data end (SE), filling data (8 symbols), blanking end (BE), image data (20 symbols), fill start (FS), filling data (8 symbols), fill end (FE), image data (20 symbols), etc. Since the filling data in the DP signal corresponds to the blank region of the frame rather than the image data to be displayed, that is, the filling data can be regarded as redundant data or invalid data. Therefore, the DP-in adapter 122 of the USB4 host 120 will remove the filling data, but the DP-in adapter 122 records the number of symbols corresponding to each filling data. Taking FIG. 4 as an example, the USB4 signal will sequentially generate a second data packet, an image data packet, etc., based on the DP signal, wherein the header of the second data packet records filling data with 5 symbols before the second data, and the header of the image data packet records filling data with 8 symbols before the image data. Therefore, the SST symbol decoder 320 can determine how many symbols the DP signal has when receiving each packet, so that the accumulator 350 can perform the accumulation operation. As shown in FIG. 4, the SST symbol decoder 320 decodes the second data packet to know that the second data corresponds to 10 symbols and has 5 symbols of filling data before the second data, so the accumulator 350 can add "15" to the original counter value (assuming that the original counter value is zero). Then, the SST symbol decoder 320 decodes the image data packet to know that the image data corresponds to 20 symbols and has 8 symbols of filling data before the image data, so the accumulator 350 can add "28" to the current counter value to have the accumulated value "43". Then, the SST symbol decoder 320 decodes the next image data packet to know that the image data corresponds to 20 symbols and has 8 symbols of filling data before the image data, so the accumulator 350 can add "28" to the current counter value to have the accumulated value "71", and so on.

It should be noted that the above calculation method is only used as an example, rather than a limitation of the present invention. As long as the SST symbol decoder 320 decodes each packet to obtain the number of symbols of the DP signal actually corresponding to each packet, the SST symbol decoder 320 can have different calculation and determination mechanisms. For example, the SST symbol decoder 320 can determine the actual number of symbols of the DP signal corresponding to each packet according to the number of blanking starts (BS) or the number of other fields received in the SST packet. In another embodiment, the above-mentioned calculation method of the counter value of the accumulator 350 is only an example, rather than a limitation of the present invention. As long as the accumulator 350 calculates the counter value according to a decoding result of the SST symbol decoder 320, the decoding result can be the number of symbols of the DP signal corresponding to each packet, or a value corresponding to the number of symbols of the DP signal corresponding to each packet (e.g., the value proportional to the number of symbols of the DP signal, or the value calculated based on the number of symbols of the DP signal). For example, the counter value added by the accumulator 350 can be proportional to the number of symbols of the DP signal corresponding to each packet.

On the other hand, if the decoder 210 outputs the MST packet, the MST symbol decoder 330 decodes the MST packet to calculate the number of symbols of the DP signal actually corresponding to the currently received packet, and transmits the calculated number of symbols to the accumulator 350 via the multiplexer 340. In detail, referring to FIG. 5, sixty-four time slots are used in the transmission mechanism of the MST packet, and different streams are transmitted in a time-division multiplexing manner. A packet will be transmitted in the time slot "0", so the MST symbol decoder 330 can notify the accumulator 350 to add "64" to the current counter value as long as it determines that the received packet corresponds to the time slot "0", as shown in FIG. 5.

Figure 5:
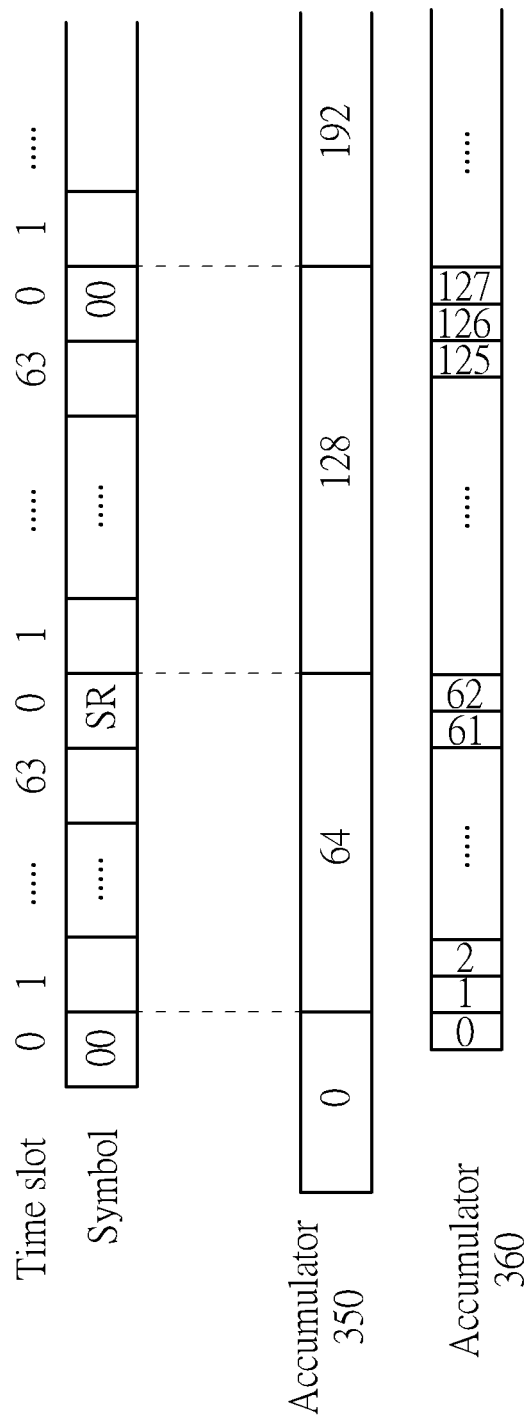
FIG. 5 shows operations of a MST symbol decoder and an accumulator according to one embodiment of the present invention.

It is noted that FIG. 5 is only an example, not a limitation of the present invention. Based on a similar concept, in other embodiments, the MST symbol decoder 330 decodes each packet to determine whether the packet corresponds to a specific time slot, and if the packet corresponds to the specific time slot, the accumulator 350 adds a predetermined value to the current counter value, wherein the specific time slot is not limited to the time slot "0" shown in FIG. 5, and the predetermined value is not limited to "64" in the embodiment of FIG. 5. For example, the predetermined value may be a total number of time slots used, or any value that can represent the number of received symbols, or a value proportional to the number of received symbols.

Referring to FIGS. 4 and 5, the accumulator 360 starts counting at the same time as the accumulator 350, but the accumulator 360 is simply counted by using the clock signal CLK generated by the clock signal generating circuit 260, that is, the counter value generated by the accumulator 360 can be regarded as how many cycles of the clock signal CLK have passed since the count was started.

Then, the adjustment circuit 370 receives a counter value AN1 from the accumulator 350 and a counter value AN2 from the accumulator 360, and compares the counter value AN1 and the counter value AN2 to determine whether to increase or decrease the frequency of the clock signal CLK, and the control signal Vc2 is generated accordingly. For example, considering that the counter value AN1 is updated after decoding the packet, but the counter value AN2 is continuously updated according to the clock signal CLK, the adjustment circuit 370 can determine whether the difference between the counter value AN1 and the counter value AN2 is greater than a threshold value, so as to determine whether to increase or decrease the frequency of the clock signal CLK. Specifically, if the counter value AN1 is greater than the counter value AN2 plus a threshold value TH, that is, AN1>(AN2+TH), the control signal Vc2 is generated to increase the frequency of the clock signal CLK; and if the counter value is AN2 is greater than the counter value AN1 plus the threshold TH, that is, AN2>(AN1+TH), then the control signal Vc2 is generated to reduce the frequency of the clock signal CLK. In addition, if the difference between the counter value AN1 and the counter value AN2 is not greater than the threshold, that is (AN1−AN2)<TH, then the control signal Vc2 is not generated, or the control signal Vc2 is generated to make the clock signal CLK maintain the current frequency.

It is noted that, in the above embodiment, the counter value AN1 is the number of symbols of the DP signals corresponding to the currently received packet outputted by the SST symbol decoder 320 or the MST symbol decoder 330, and the counter value AN2 is how many cycles of the clock signal CLK have elapsed after starting to count, however, the present invention is not limited to this. In other embodiments, as long as the counter value AN1 and the counter value AN2 are obtained according to the same calculation method, for example, the counter value AN1 is obtained by using a calculation step (e.g., proportional calculation) to calculate the number of symbols of the DP signals corresponding to the currently received packet, and the counter value AN2 is obtained by using the same calculation step to calculate a value of how many cycles of the clock signal CLK have elapsed after starting to count, these alternative designs shall fall within the scope of the present invention.

Finally, referring to FIG. 2, the DP signal generating circuit 230 reads the SST packet or the MST packet stored in the buffer 220, and reconstructs the DP signal and transmits the DP signal to the DP sink device 140 according to the clock signal CLK.

It is noted that the DP-out adapter 132 shown in FIG. 2 includes the synchronization packet processing circuit 240 and the symbol counter value comparator 250 to respectively generate control signals Vc1 and Vc2 to control the frequency of the clock signal CLK generated by the clock signal generating circuit 260. In other embodiments, however, the synchronization packet processing circuit 240 can be removed from the DP-out adapter 132, that is the clock signal generating circuit 260 only adjusts the frequency of the clock signal CLK according to the control signal Vc2 generated by the symbol counter value comparator 250. This alternative design shall fall within the scope of the present invention.

Briefly summarized, in the DP-out adapter and associated control method, by analyzing the content of the packets in real time to obtain the number of symbols of the DP signal corresponding to each packet, accumulating the number of symbols corresponding to each packet to obtain a first counter value, and by using a local clock signal to count to obtain a second counter value, and comparing the first counter value and the second counter value to generate a control signal to the clock signal generating circuit to adjust the frequency of the clock signal, the frequency adjustment interval of the clock signal can be shortened to avoid the problem caused by the long frequency adjustment interval in the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A displayport (DP)-out adapter, comprising:
a decoder, configured to decode a universal serial bus (USB) signal to generate a plurality of packets, wherein the USB signal is complied with USB version 4 specification;
a clock signal generating circuit, configured to generate a clock signal;
a DP signal generating circuit, configured to generate a DP signal according to the plurality of packets, and output the DP signal according to the clock signal; and
a symbol counter value comparator, configured to generate a first counter value according to a number of symbols corresponding to the plurality of packets in real time, and use the clock signal to count to obtain a second counter value, and compare the first counter value and the second counter value to generate a control signal to the clock signal generating circuit to adjust a frequency of the clock signal;
wherein if the plurality of packets are single stream transport (SST) packets, the symbol counter value comparator decodes each packet, and calculates the first counter value according to a decoding result, wherein the decoding result is a number of symbols of a DP signal that each packet actually corresponds to, or the decoding result is a value corresponding to the number of symbols of the DP signal that each packet actually corresponds to;
wherein if the plurality of packets are multi-stream transport (MST) packets, the symbol counter value comparator decodes each packet, and determines if the packet corresponds to a specific time slot; and if the packet corresponds to the specific time slot, the symbol counter value comparator adds a predetermined value to the first counter value.

2. The DP-out adapter of claim 1, wherein the specific time slot is time slot "0", and the predetermined value is a total number of time slots used.

3. A displayport (DP)-out adapter, comprising:
a decoder, configured to decode a universal serial bus (USB) signal to generate a plurality of packets;
a clock signal generating circuit, configured to generate a clock signal;
a DP signal generating circuit, configured to generate a DP signal according to the plurality of packets, and output the DP signal according to the clock signal; and
a symbol counter value comparator, configured to generate a first counter value according to a number of symbols corresponding to the plurality of packets in real time, and use the clock signal to count to obtain a second counter value, and compare the first counter value and the second counter value to generate a control signal to the clock signal generating circuit to adjust a frequency of the clock signal;
wherein the symbol counter value comparator comprises:
a single stream transport (SST) symbol decoder, wherein if the plurality of packets are SST packets, the SST symbol decoder decodes each packet to obtain a number of symbols of a DP signal that each packet actually corresponds to;
a multi-stream transport (MST) symbol decoder, wherein if the plurality of packets are MST packets, the MST symbol decoder decodes each packet to determine if the packet corresponds to a specific time slot; and if the packet corresponds to the specific time slot, the MST symbol decoder generates a predetermined value; and
a first accumulator, configured to continuously receive the number of symbols of the DP signal that each packet actually corresponds to from the SST symbol decoder, or receive the predetermined value from the MST symbol decoder, to generate the first counter value.

4. The DP-out adapter of claim 3, wherein the symbol counter value comparator further comprises:
a second accumulator, configured to continuously use the clock signal to count to obtain the second counter value.

5. The DP-out adapter of claim 4, wherein the symbol counter value comparator further comprises:
an adjustment circuit, configured to determine if a difference between the first counter value and the second counter value is greater than a threshold value, to generate the control signal to the clock signal generating circuit to adjust the frequency of the clock signal.

6. The DP-out adapter of claim 5, wherein if the first counter value is greater than the second counter value plus the threshold value, the adjustment circuit generates the control signal to the clock signal generating circuit to increase the frequency of the clock signal; and if the second counter value is greater than the first counter value plus the threshold value, the adjustment circuit generates the control signal to the clock signal generating circuit to reduce the frequency of the clock signal.

7. A control method of a displayport (DP)-out adapter, comprising:
decoding a universal serial bus (USB) signal to generate a plurality of packets;
using a clock signal generating circuit to generate a clock signal;
using a DP signal generating circuit to generate a DP signal according to the plurality of packets, and output the DP signal according to the clock signal;
generating a first counter value according to a number of symbols corresponding to the plurality of packets in real time;
using the clock signal to count to obtain a second counter value; and
comparing the first counter value and the second counter value to generate a control signal to the clock signal generating circuit to adjust a frequency of the clock signal;
wherein the step of generating the first counter value according to the number of symbols corresponding to the plurality of packets in real time comprises:
if the plurality of packets are single stream transport (SST) packets, decoding each packet to obtain a number of symbols of a DP signal that each packet actually corresponds to;
if the plurality of packets are multi-stream transport (MST) packets, decoding each packet to determine if the packet corresponds to a specific time slot and if the packet corresponds to the specific time slot, generating a predetermined value; and
continuously receiving the number of symbols of the DP signal that each packet actually corresponds to, or continuously receiving the predetermined value, to generate the first counter value.

8. The control method of claim 7, wherein the USB signal is complied with USB version 4 specification.

9. The control method of claim 7, wherein the step of comparing the first counter value and the second counter value to generate the control signal to the clock signal generating circuit to adjust the frequency of the clock signal comprises:

determining if a difference between the first counter value and the second counter value is greater than a threshold value, to generate the control signal to the clock signal generating circuit to adjust the frequency of the clock signal.

10. The control method of claim 9, wherein the step of comparing the first counter value and the second counter value to generate the control signal to the clock signal generating circuit to adjust the frequency of the clock signal comprises:

if the first counter value is greater than the second counter value plus the threshold value, generating the control signal to the clock signal generating circuit to increase the frequency of the clock signal; and if the second counter value is greater than the first counter value plus the threshold value, generating the control signal to the clock signal generating circuit to reduce the frequency of the clock signal.

\* \* \* \* \*